(No Model.)
R. A. MORSE.
EGG TURNER FOR INCUBATORS.
No. 578,609. Patented Mar. 9, 1897.
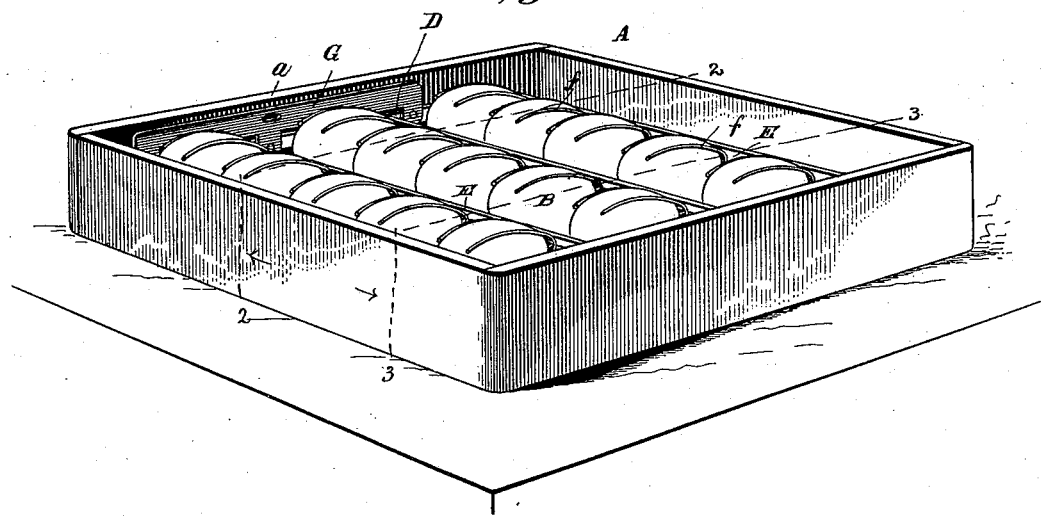
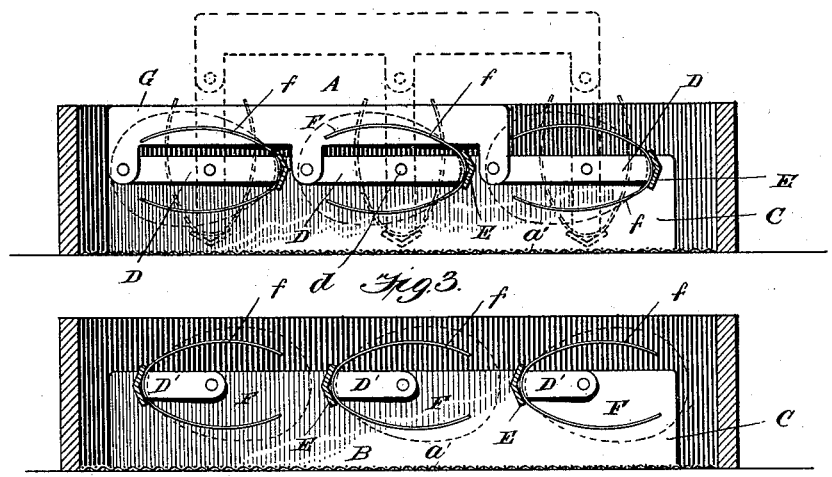
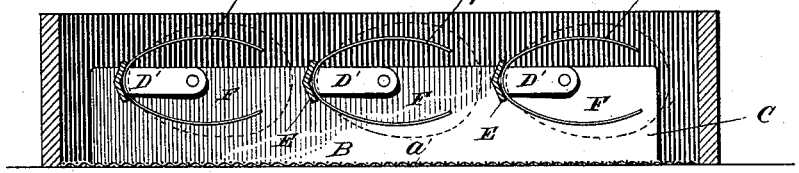
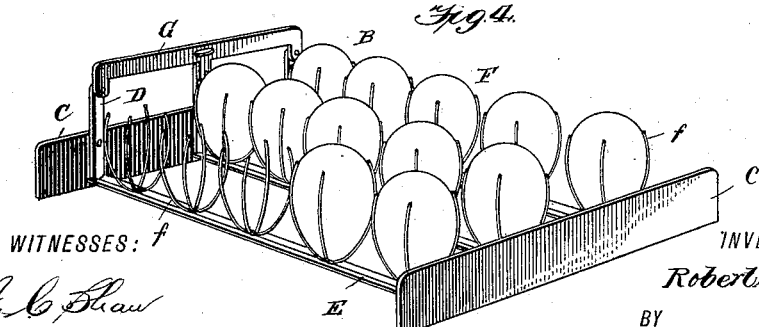
WITNESSES:
INVENTOR
Robert A. Morse,
BY
Fred G. Dieterich & Co.
ATTORNEYS.

UNITED STATES PATENT OFFICE.

ROBERT A. MORSE, OF PORTLAND, OREGON.

EGG-TURNER FOR INCUBATORS.

SPECIFICATION forming part of Letters Patent No. 578,609, dated March 9, 1897.

Application filed May 5, 1896. Serial No. 590,290. (No model.)

*To all whom it may concern:*

Be it known that I, ROBERT A. MORSE, residing at Portland, in the county of Multnomah and State of Oregon, have invented a new and Improved Egg-Turner for Incubators, of which the following is a specification.

This invention relates generally to incubators, particularly to the egg-trays, and more especially to the improved means for holding and turning the eggs within said tray.

In an incubator it is necessary to turn the eggs over at least once every day, and heretofore eggs have been turned by hand, by transverse sections forming cells and sliding over a stationary bottom, or sections or cells remaining stationary and the bottom sliding, or by a system of rollers, and by turning the rollers the eggs on the same are turned. Still another method is to put the eggs in a tray and laying a corresponding tray over them and turning both trays over and dispensing with the first until the next time of turning. The objection to all these methods is that there is too much jar, and, furthermore, they consume considerable time.

The object of my invention, therefore, is to provide an improved egg holder and turner which will avoid all of these objections, and another object is to provide an improved holder and turner which can be applied to any of the trays now in use and which will gently and easily reverse the positions of all of the eggs at one and the same time by simply shifting an operating-bar.

Another object is to provide a holder which can be filled either while in the tray or out of the same, and another object is to provide an improved device by means of which the eggs will be held entirely separate or independent of each other and a definite distance apart, whereby they are all exposed to a uniform and maximum amount of heat.

With these various objects in view my invention consists in the peculiar construction of the several parts and in their novel combination or arrangement, all of which will be fully described hereinafter and pointed out in the claims.

In the drawings forming a part of this specification, Figure 1 is a view showing a tray provided with my improved holder and turner and filled with eggs. Fig. 2 is a sectional view on the line 2 2 of Fig. 1, the eggs being removed. Fig. 3 is a sectional view on the line 3 3 of Fig. 1, the eggs being removed; and Fig. 4 is a view showing the holder and turner detached from the tray and partially filled with eggs.

In carrying out my invention I employ a tray A, which is composed, as usual, of the wooden sides $a$ and the wire-gauze or slat bottom $a'$. Within this tray I arrange my improved holder B, and in constructing such holder I employ the side strips C, preferably of metal, and which are intended to be detachably secured to the sides of the tray. Pivoted to one of the side strips C are a series of lever-arms D, and pivotally attached to the opposite strip are a series of arms D', and connecting the opposing pairs of arms D and D' are the bars E, to which are attached a series of individual egg-holders F, each holder consisting of four wires $f$, more or less, or any other suitable form of holder, secured to the bars E and curved, as shown, to conform to the configuration of the egg and provide a sort of pocket to hold the same, and in practice I prefer to make the bars V-shaped in cross-section, for the purpose of strength and also to provide a better means of attachment for the wires or parts of the holder and also for aiding in keeping the said wires in their proper relative position.

The lever-arms D are pivoted centrally to the side strip C, as shown at $d$, and at their upper ends are pivotally connected to a common shifter-bar G, so that by moving the said bar back or forth all of the arms will be operated simultaneously, and as said arms are rigidly connected at their lower ends to the bars E it is obvious that said bars will be swung around in the arc of a circle in a direction opposite to the movement of the shifter-bar, and as the holders are rigidly attached to the bars and hold the eggs firmly therein it is obvious that when the bars are shifted the position of the egg will be reversed.

Now in operation the combined holder and turner constructed substantially as shown in Fig. 4 can be attached to the ordinary incubator-tray or said holder and turner may be left detached from said tray, but in practice I prefer to secure them within the tray in a detachable manner, so that in case it becomes necessary to remove the same it can be readily accomplished.

In order to fill the holder, the shifter-bar is moved to an intermediate position, which brings all of the holders in an upright position with their open ends uppermost. The eggs are then inserted point downward, preferably, until all of the wire holders are filled. The shifter-bar is then thrown either back or forth, throwing the holders and eggs to a horizontal position.

When it is desired to reverse the positions of the eggs, it is only necessary to reverse the position of the shifter-bar, as this operation simultaneously oscillates and reverses the positions of the lever-arms, cross-bars, holders, and eggs, and all in a gentle and easy manner, so that there is no danger whatever of the eggs being shaken during the reversing operation.

The egg-holders are held normally in a horizontal position, and in oscillating the arms to swing them from one side of their pivots to the other the eggs are turned end for end and completely reversed.

Having thus described my invention, what I claim as new, and desire to secure by Letters Patent, is—

1. In a device of the kind described, a tray, a pair of oppositely-disposed arms pivotally mounted in the tray, normally arranged horizontally and capable of oscillation to carry them from one side of their pivots to the other, a horizontal bar rigidly connected to and carried by said arms, and a series of individual egg-holders mounted on the bar conforming to the configuration of an egg and disposed longitudinally of the arms whereby eggs will be held normally in a horizontal position and will be completely reversed without shock or jar when the arms are swung from one side of their pivots to the other substantially as shown and described.

2. In a device of the class described, a tray, oppositely-disposed arms arranged in pairs and pivoted at opposite sides of the tray, the arms at one side of the tray being pivoted intermediate of their ends to form lever-arms, the bars rigidly connected with the lower ends of said arms, egg-holders mounted on the bars and disposed longitudinally of the arms, and the shifting-bar pivotally connected to the upper ends of the lever-arms substantially as shown and described.

3. In a device of the kind described, the combination with the tray, of the combined holder and turner, said combination holder and turner comprising the side pieces, the lever-arms pivoted thereto, the cross-bars connecting the lower ends of said lever-arms, the shifter-bar connected to the upper ends of the lever-arms, said cross-bars being preferably V-shaped in cross-section, and the holders attached to the said cross-bars, substantially as and for the purpose described.

ROBERT A. MORSE.

Witnesses:
A. T. LEWIS,
S. H. BLOOMER.